United States Patent [19]

Amoroso

[11] Patent Number: 5,295,773
[45] Date of Patent: Mar. 22, 1994

[54] SELF-LOCKING PRESSED IN INSERT ARRANGEMENT

[75] Inventor: Robert M. Amoroso, East Hartford, Conn.

[73] Assignee: United Technologies Corporation, Hartford, Conn.

[21] Appl. No.: 62,267

[22] Filed: May 17, 1993

Related U.S. Application Data

[63] Continuation of Ser. No. 974,005, Nov. 10, 1992, abandoned.

[51] Int. Cl.⁵ .................................................. F16B 13/06
[52] U.S. Cl. ................................... 411/60; 411/280; 403/320; 403/406.1
[58] Field of Search ............... 411/265, 280, 277, 439, 411/924.1, 174, 175, 266, 272, 335, 167; 403/320, 284, 273, 406.1

[56] References Cited

U.S. PATENT DOCUMENTS

| | | | |
|---|---|---|---|
| 449,659 | 4/1891 | Barrett et al. | 411/280 |
| 896,709 | 8/1908 | Bryce | 411/167 |
| 1,539,513 | 5/1925 | Ross | 411/265 X |
| 1,597,698 | 8/1926 | Tinker | 411/265 |
| 2,365,137 | 12/1944 | Johnson | 411/167 |
| 2,373,473 | 4/1945 | Henningsen . | |
| 2,448,766 | 9/1948 | Burker | 411/265 X |
| 2,720,905 | 10/1955 | Bessom . | |
| 3,003,533 | 10/1961 | Hubbard . | |
| 3,332,463 | 7/1967 | Seckerson et al. | 411/265 |
| 4,005,740 | 2/1977 | Villo et al. | 411/167 |
| 4,068,697 | 1/1978 | Schiaffino | 411/266 X |
| 4,828,441 | 5/1989 | Frasea | 411/183 |

FOREIGN PATENT DOCUMENTS

| | | | |
|---|---|---|---|
| 2017887 | 10/1971 | Fed. Rep. of Germany | 411/280 |
| 3130668 | 2/1983 | Fed. Rep. of Germany | 411/272 |
| 682883 | 6/1930 | France | 411/265 |
| 590506 | 1/1978 | U.S.S.R. | 411/288 |
| 261997 | 12/1926 | United Kingdom | 411/280 |
| 559959 | 3/1944 | United Kingdom | 411/266 |
| 849602 | 9/1960 | United Kingdom | 411/167 |

*Primary Examiner*—Rodney M. Lindsey
*Attorney, Agent, or Firm*—Edward L. Kochey, Jr.

[57] ABSTRACT

Insert 16 has four radial slots 26 through shoulder 22 and wall 28. It is press fit within smooth hole 32 in case 10. Internal threads 24 are strained in the locking range 36 where bolt 18 is locked.

3 Claims, 3 Drawing Sheets

SELF-LOCKING PRESSED IN INSERT ARRANGEMENT

This is a continuation application under 35 CFR 1.62 of prior pending application Ser. No. 07/974,005 filed Nov. 10, 1992 now abandoned.

TECHNICAL FIELD

The invention relates to bolting of components to difficult to machine materials, and in particular to a self locking threaded insert for use therewith.

BACKGROUND OF THE INVENTION

In gas turbine engines a diffuser case for the combustor is normally made of a high nickel super alloy. The fuel injector must be bolted to this diffuser. The diffuser material however, is very hard and difficult to machine. Tapping of holes therein will frequently lead to breakage of the tap and the requirement to electro-discharge machine the tap out of the case or otherwise introduce difficult and expensive repairs.

It is accordingly known to use inserts located in drilled holes through the case. This not only avoids the necessity of tapping these holes, but also avoid the stress concentrations caused by such threading.

The possibility of bolts becoming loose and thereafter ingested into the turbine must be avoided. With non-locking inserts it is required that the bolts be safety wired into place. The nature of this wiring is critical and very time consuming. Furthermore a supply of wire must be maintained at each supply depot.

Various other self locking arrangements have been found to be difficult to install and or remove when required.

A self locking insert arrangement is required which is inexpensive, reliable and easily replaceable.

SUMMARY OF THE INVENTION

The casing has a uniform diameter hole therethrough. A hollow cylindrical insert is formed with a radially extending shoulder on one end. The insert is internally threaded the full length with the threads being uniform when the insert is in its unstrained condition.

A plurality of radial slots are EDM'd through the shoulder and wall from the end having a shoulder. The insert is press fit within the hole so that the portion having the slots is strained inwardly more than the remainder. The threads accordingly are pinched in at the end by an amount which is a function of the press fit and the size of the slots. The threaded bolt is installed from the side opposite the shoulder. The first portion of the threads has a conventional loose fit but an interference fit is accomplished at the slotted portion. Preferably, the threaded bolt extends at least two threads past the shoulder since this end of the bolt usually has a reduced diameter of the threaded portion.

DESCRIPTION OF THE PREFERRED EMBODIMENT

Figure 1:
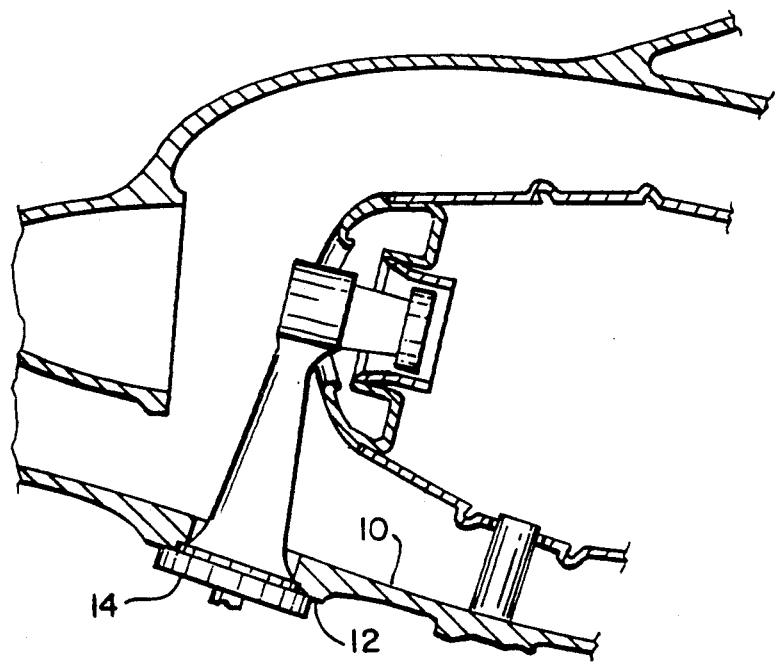
FIG. 1 shows a fuel nozzle mounted in a diffuser case.
Figure 2:
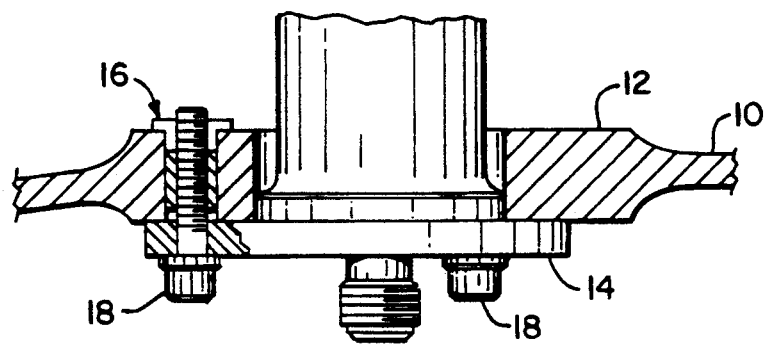
FIG. 2 is a section through this mounting.

FIG. 1 illustrates a diffuser casing 10 of the combustor of a gas turbine engine with a thickened portion 12 to which a fuel injector 14 is secured. This is bolted as shown in FIG. 2.

A self locking insert 16 is press fit in a hole through the casing 10 with a plurality of bolts 18 threaded into a plurality of inserts. The insert and its relationship with the bolt is better shown in the later figures.

Figure 3:
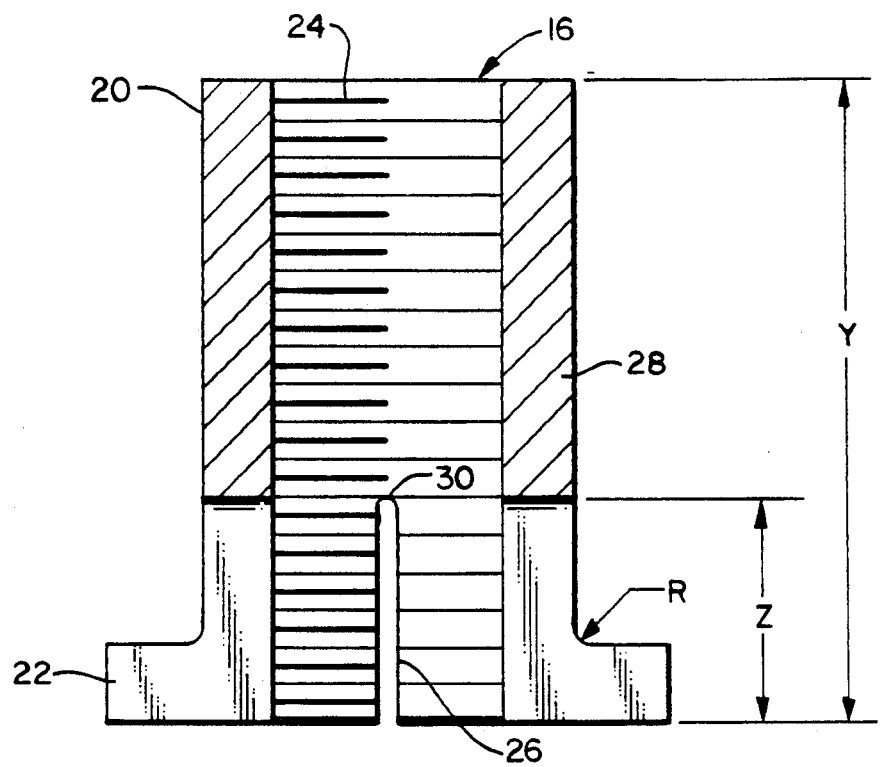
FIG. 3 is a section through a self locking threaded insert.
Figure 4:
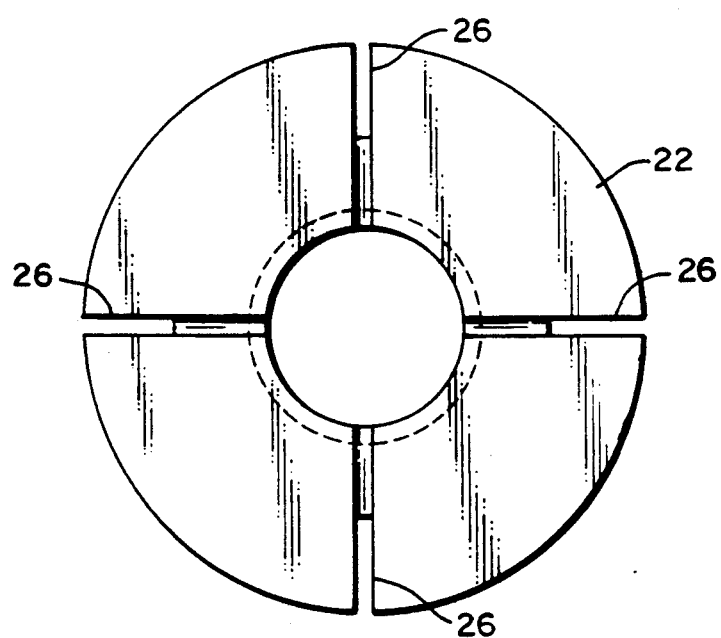

Referring to FIG. 3, insert 16 is shown with a length Y of 12.2 mm. The hollow cylindrical body 20 of the insert has an outside diameter of 14.9 mm. Shoulder 22 is radially extending at one end of the insert and has an outside diameter of 14.0 mm. The root radius R is 1.0 mm and is related to the radius at the end of the drilled hole through the case in that the radius of the insert is less than that of the thru hole.

Internal threads 24 are standard threads and are uniform throughout the length both as to pitch and diameter with the unstrained insert as illustrated here.

Four radial slots 26 are formed through the shoulder and wall 28 of the insert. The slots are 0.0203 mm wide and they are preferably electro-discharge machined to a depth of 4.064 mm. The bottom of each slot 30 is accordingly rounded so that it eliminates the possibility of cracks originating at the slot end.

Figure 5:
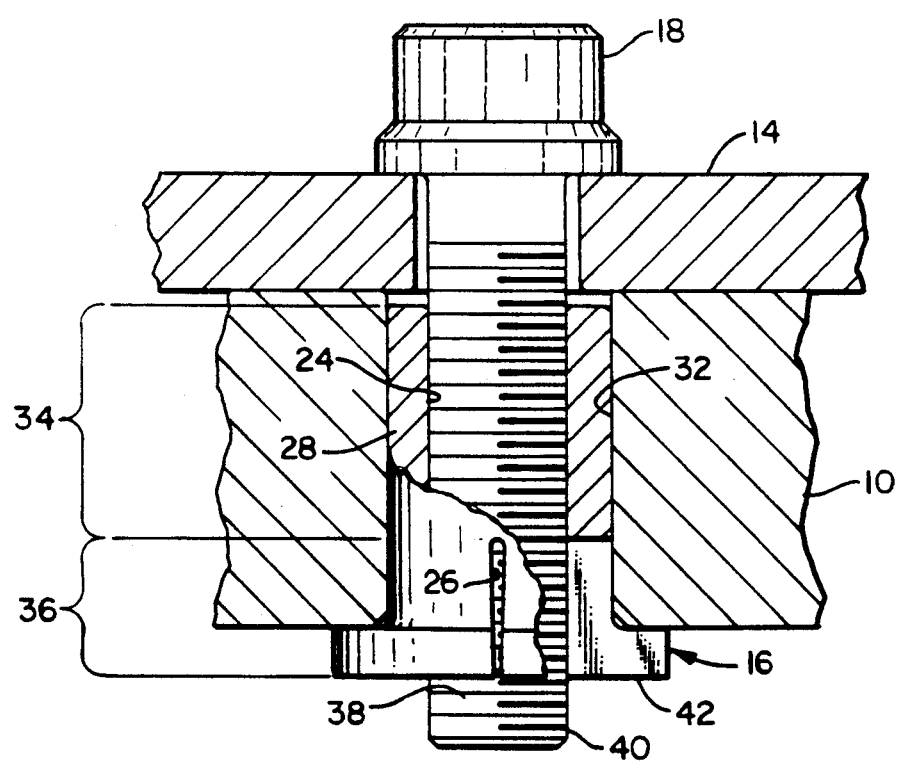

In FIG. 5 the insert 16 is shown press fit within the smooth hole 32 through case 10. This should result in an interference of 0.02 to 0.084 mm on the diameter, independent of the magnitude of the diameter. In the non-locking range 34 there is some very slight decrease in diameter because of the compression of the annular insert as it is force fit within the hole 32. In the locking range 36 there is much more strain and the inside diameter of the threads 24 is significantly less toward the end of the bolt.

When inserting the bolt it passes freely through the non-locking range 34 beginning to bind up as it passes through the locking range 36. The axial slots during the press fit bite into the edges of the case therefore deterring rotation of the insert. This is in addition to the anti-rotational effect due to the tight fit between the insert and the hole. They furthermore form sharp edges operating against bolt 18 thereby adding to the resistance to torque between the insert and the bolt. Also the sharp edges of the slots there is a type of a threading operation inherently carried out on the bolt so that the bolt tends to wear more than the insert during insertion. This is an advantage since the bolt must be replaced frequently, while the insert is less frequently replaced. Replacement of the insert involves pressing the old insert out and force fitting a new one into place.

The end threads 38 of the bolt have narrow diameters. In order to obtain reliable and predictable locking of the bolts it is preferred that the end 40 of the bolt extend at least two threads past the face 42 of the shoulder of the bolt.

I claim:

1. A self locking insert arrangement for securing a part, comprising:
    a casing having a uniform diameter unthreaded hole therethrough;
    a hollow cylindrical insert having an axis and an annular wall;
    a radially extending shoulder perpendicular to said axis at one end of said insert;
    said insert internally threaded the full length thereof, and having a uniform outside diameter through the entire length exclusive of said shoulder;
    a plurality of radial slots through said shoulder and wall from the end having said shoulder axially extending through said shoulder and a portion of said wall;

said insert installed within said hole with a first interference fit through the entire length exclusive of said shoulder, whereby said internal threads are strained inwardly more at the slotted portion of said insert than at the unslotted portion of said insert; and a threaded bolt installed within said insert from the end of said insert opposite said should with a loose fit in said unslotted portion, but a second interface fits in said slotted portion.

2. A self locking insert arrangement as in claim 1 further comprising:
said threaded bolt extending at least two threads past said shoulder in the installed position.

3. A self locking insert arrangement as in claim 1, further comprising:
said first interference fit being between 0.02 mm and 0.084 mm.

* * * * *